United States Patent
Raffles et al.

(10) Patent No.: US 9,102,025 B2
(45) Date of Patent: Aug. 11, 2015

(54) ADHESIVE FASTENING ELEMENTS FOR HOLDING A WORKPIECE AND METHODS OF DE-BONDING A WORKPIECE FROM AN ADHESIVE FASTENING ELEMENT

(75) Inventors: Mark H. Raffles, Nottingham (GB); Dragos Axinte, Nottingham (GB); Helen L. Llewellyn-Powell, Derby (GB)

(73) Assignee: ROLLS-ROYCE plc, London (GB)

( * ) Notice: Subject to any disclaimer, the term of this patent is extended or adjusted under 35 U.S.C. 154(b) by 653 days.

(21) Appl. No.: 13/528,228

(22) Filed: Jun. 20, 2012

(65) Prior Publication Data
US 2013/0011218 A1 Jan. 10, 2013

(30) Foreign Application Priority Data
Jul. 4, 2011 (GB) .................................. 1111315.6

(51) Int. Cl.
*F16B 39/02* (2006.01)
*B23Q 3/08* (2006.01)

(52) U.S. Cl.
CPC ...................... *B23Q 3/084* (2013.01)

(58) Field of Classification Search
CPC ...... F16B 13/14; F16B 13/142; F16B 13/143; F16B 13/145; F16B 13/146; F16B 11/008
USPC ......................................................... 411/82
See application file for complete search history.

(56) References Cited

U.S. PATENT DOCUMENTS

| | | | | |
|---|---|---|---|---|
| 2,550,357 A * | 4/1951 | Jansen et al. | ............ | 411/399 |
| 3,114,201 A | 12/1963 | Boccaccio et al. | | |
| 3,240,379 A * | 3/1966 | Bremer et al. | ............ | 220/359.1 |
| 3,532,316 A * | 10/1970 | Mathes | ............ | 248/205.3 |
| 3,897,535 A | 7/1975 | Lapac et al. | | |
| 3,963,551 A | 6/1976 | Marlinski | | |
| 4,063,582 A * | 12/1977 | Fischer | ............ | 411/82.1 |
| 4,511,296 A * | 4/1985 | Stol | ............ | 411/20 |
| 4,749,833 A | 6/1988 | Novorsky et al. | | |
| 4,860,513 A * | 8/1989 | Whitman | ............ | 52/410 |
| 4,932,805 A * | 6/1990 | Mullen et al. | ............ | 403/13 |
| 5,143,498 A * | 9/1992 | Whitman | ............ | 411/82 |
| 5,249,899 A * | 10/1993 | Wilson | ............ | 411/82 |
| 5,360,302 A * | 11/1994 | MacMartin | ............ | 411/23 |
| 5,624,750 A | 4/1997 | Martinez et al. | | |
| 5,666,779 A * | 9/1997 | Fuchs et al. | ............ | 52/705 |
| 6,484,471 B2 * | 11/2002 | Steed et al. | ............ | 52/704 |
| 6,604,899 B2 * | 8/2003 | Kubler et al. | ............ | 411/82 |
| 6,902,366 B2 * | 6/2005 | Ducker et al. | ............ | 411/82.1 |
| 7,172,676 B2 | 2/2007 | DeMeter | | |

(Continued)

FOREIGN PATENT DOCUMENTS

| | | |
|---|---|---|
| GB | 1 213 568 | 11/1970 |
| GB | 1 517 501 | 7/1978 |

OTHER PUBLICATIONS

Oct. 28, 2011 British Search Report issued in British Patent Application No. 1111315.6.

(Continued)

*Primary Examiner* — Roberta Delisle
(74) *Attorney, Agent, or Firm* — Oliff PLC

(57) ABSTRACT

An adhesive fastening element (2) for holding a workpiece (8), the adhesive fastening element (2) comprising: an adhesive delivery tube (32) embedded in the adhesive fastening element (2) for supplying adhesive (10) to an exterior surface of the adhesive fastening element (2).

11 Claims, 12 Drawing Sheets

(56) References Cited

U.S. PATENT DOCUMENTS

| | | | |
|---|---|---|---|
| 7,524,390 B2 | 4/2009 | DeMeter et al. | |
| 8,556,558 B1* | 10/2013 | Hunt | 411/82.1 |
| 8,821,672 B2* | 9/2014 | Raffles et al. | 156/247 |
| 8,900,394 B2* | 12/2014 | Raffles et al. | 156/247 |
| 2002/0092601 A1 | 7/2002 | Sweeney, Jr. | |
| 2007/0221328 A1 | 9/2007 | DeMeter et al. | |
| 2013/0330145 A1* | 12/2013 | Cloud | 411/82 |

OTHER PUBLICATIONS http://www.mcp-group.com/ (retrieved Jun. 28, 2012).

http://www.horst-witte.de/en/products/vacuum/freeze-clamping-technology/ice-vice.php (retrieved Jun. 28, 2012).

http://www.ibagna.com/pdfs/Freeze_Chuck_PDF.pdf (retrieved Jun. 28, 2012).

"Cold Clamping for Small, Delicate Parts," *Modern Machine Shop*, May 15, 2009, Editor Matt Danford, http://www.mmsonline.com/articles/cold-clamping-for-small-delicate-parts (retrieved Jun. 28, 2012).

http://www.miteebite.com/products/mitee_grip_e.html (retrieved Jun. 28, 2012).

Dymax Adhesive Data Sheets—(6-621 Multicure Adhesive & 8-20626 Thermally Cured Adhesive) http://www.dymax.com/literature/pds.php (retrieved Jun. 28, 2012).

Range of Conductive Based Heating Elements, http://www.watlow.com/products/heaters/index.cfm (retrieved Jun. 28, 2012).

http://www.ambrell.com (retrieved Jun. 28, 2012).

http://www.ameritherm.com/PDFs/bonding_14.pdf (retrieved Jun. 28, 2012).

http://www.inductionatmospheres.com/induction_heating.html (retrieved Jun. 28, 2012).

Aug. 31, 2012 Search Report issued in European Patent Application No. 12172707.

* cited by examiner

ADHESIVE FASTENING ELEMENTS FOR HOLDING A WORKPIECE AND METHODS OF DE-BONDING A WORKPIECE FROM AN ADHESIVE FASTENING ELEMENT

The present invention relates to adhesive fastening elements for holding a workpiece and methods of de-bonding a workpiece from an adhesive fastening element.

BACKGROUND

It is known to use workholding devices to hold a workpiece still whilst performing manufacturing processes, such as machining, or whilst inspecting the workpiece.

The most common methods of workholding, i.e. mechanical clamping, vacuumed chucks and magnetic systems, all possess some limitations, particularly when delicate or difficult to hold parts require processing which involves mechanical loading (e.g. machining).

Several non-conventional workholding technologies have been developed to address some of the limitations of the common methods described above.

For example, low melt alloys, adhesives, resins, waxes, and water-ice have been employed to encapsulate irregular or delicate parts in order to ease manufacture. However, encapsulation is often undesirable as the parts have to be subsequently removed from the encapsulation media. Furthermore, whilst low melt alloys such as lead-bismuth-tin composition are stronger than waxes, small amounts of the alloy may be left on the workpiece (i.e. a turbine blade), causing corrosion problems.

It is also known to use magneto rheological fluids to hold parts during machining operations. With such fluids, the parts are locked in place when a magnetic field is applied to the fluid and are released after removal of the magnetic field. However, such systems are complex and thus expensive. The components are also susceptible to gradual movement if a continuous force is applied.

Adhesive based fixture techniques may also be used for holding a workpiece. For example, Photo-activated Adhesive Workholding (PAW) employs an adhesive which is activated by light. Such adhesives have a short cure time and provide a strong bond. However, it is necessary to de-bond the workpiece from the workholding device after the machining operation has been completed.

An example of a PAW technique is the Light Activated Adhesive Gripping (LAAG) system. The LAAG system uses an ultraviolet spot Lamp and light guide to direct UV light through gripping pins (fastening elements or pins) to rapidly cure a photo-activated adhesive applied to the gripping pin surface. The workpiece, which is loaded against the adhesive on the gripping pins, is held in place during machining by the adhesive bond. The workpiece may be de-bonded from the gripping pins by mechanically breaking the bond or using laser radiation to break the bond. Residual adhesive may be removed from the workpiece and gripping pins by mechanical abrasion.

FIGS. 1 and 2 show gripping pins used in the LAAG system which allow the workpiece to be de-bonded from the gripping pin by mechanically breaking the adhesive bond.

Specifically, FIG. 1 shows a workholding device comprising a base plate 1 and a rod or gripping pin 3. The gripping pin 3 projects above the base plate 1 and supports a workpiece 5. A photo-activated adhesive 7 is disposed between the gripping pin 3 and the workpiece 5. The gripping pin 3 has an optically transparent inner portion 9 which transmits light to the adhesive 7 so as to cure the adhesive 7, thus forming a bond between the gripping pin 3 and the workpiece 5.

After the required manufacturing processes have been completed, it is necessary to remove the workpiece 5 from the gripping pin 3. The base plate 1 and gripping pin 3 have complementary screw threads 11, and a head 13 of the gripping pin 3 is engaged by a motor 15 which causes the gripping pin 3 to rotate and translate away from the workpiece 5. This action mechanically breaks the adhesive bond between the gripping pin 3 and the workpiece 5.

However, the arrangement of FIG. 1 requires that the workpiece 5 is sufficiently supported so as to prevent rotation and translation of the workpiece 5 with the gripping pin 3. This may not always be possible with fragile components.

FIG. 2 shows an alternative workholding device which provides support to the workpiece 5 during the de-bonding process. The gripping pin 3 is provided with an external supporting member 17. The gripping pin 3 is threadably coupled with the supporting member 17 and thus translates relative to the supporting member 17 as it is rotated by the motor 15 to de-bond the workpiece 5. The supporting member 17 has an annular shoulder 19 that prevents translation of the workpiece 5 during rotation of the gripping pin 3. However, again, it is necessary to prevent rotation of the workpiece 5. Furthermore, the translation of the gripping pin 3 may cause damage to the workpiece 5 even when supported by the annular shoulder 19.

As described above, mechanically breaking the bond can induce large stresses in the workpiece and is therefore unsuitable for fragile items. Furthermore, depending on the geometry of the workpiece, it may be difficult to direct laser radiation towards the adhesive.

It is also difficult to apply the adhesive to the gripping pin surface, particularly with the workpiece in situ. Consequently, the application of the adhesive may be inaccurate and messy.

Moreover, it is often difficult to determine whether the adhesive at the gripping pin surface has been adequately cured. Consequently, the duration of the curing process is typically set to be much longer than required to cure the adhesive so as to ensure complete curing. This increases the time taken to perform the manufacturing process, and thus the cost.

The process of removing residual adhesive from the gripping pins is time consuming and delays further operations on other workpieces. Furthermore, the removal of the residual adhesive may gradually damage the surface of the gripping pin, requiring the pins to be replaced frequently.

Furthermore, the LAAG system suffers from additional limitations, for example, in that:
  it is not possible to determine whether the workpiece is securely held before commencing the machining operation;
  it can only hold flat workpieces;
  the impact strength of the bond between the workpiece and the workholding may not be sufficiently high;
  it requires expensive optical materials; and
  it requires costly auxiliary equipment, such as a light guide and UV lamp.

It is therefore desirable to provide adhesive fastening elements and methods of de-bonding which alleviate some or all of these problems and allows the workpiece to be de-bonded without causing damage to the workpiece.

STATEMENTS OF INVENTION

In accordance with an aspect of the invention there is provided an adhesive fastening element for holding a workpiece, the adhesive fastening element comprising: an adhesive delivery tube embedded in the adhesive fastening element for supplying adhesive to an exterior surface of the adhesive fastening element.

Embedding an adhesive delivery tube in the adhesive fastening element itself allows the adhesive to be accurately directed to the surface of the adhesive fastening element, even with the workpiece in situ. This allows a uniform layer of adhesive to be applied in a simple and tidy manner.

The tube may be located in the centre of the adhesive fastening element.

The tube may be configured to prevent adhesive from curing within the tube.

The tube may be opaque.

The tube may be non-metal.

The adhesive fastening element may comprise a plurality of movable pins, and adhesive delivery tubes may be embedded in one or more of the pins.

The adhesive delivery tubes may be embedded in a plurality of the pins.

The pins having adhesive delivery tubes may be grouped together in the centre of the adhesive fastening element.

The pins having adhesive delivery tubes may be distributed throughout the pins. Such a configuration may allow the adhesive to be uniformly distributed across the interface between the adhesive fastening element and the workpiece.

In accordance with another aspect of the invention, there is provided a method for de-bonding a workpiece from an adhesive fastening element, the adhesive fastening element comprising: a first member; and a second member adjacent the first member and movable relative to the first member along a longitudinal axis of the adhesive fastening element; wherein a bond is formed by an adhesive between the workpiece and the first and second members of the adhesive fastening element; the method comprising: moving the first and second members relative to one another such that the second member moves away from the workpiece so as to break the bond between the second member and the workpiece; and moving the first and second members relative to one another such that the second member moves towards the workpiece and applies a force to the workpiece so as to break the bond between the first member and the workpiece, and to de-bond the workpiece from the adhesive fastening element.

This method of de-bonding a workpiece from an adhesive fastening element does not induce excessive stress in the workpiece. Particularly, during the first stage, the adhesive remains bonded to the outer member and thus prevents stresses from being induced in the workpiece.

The first and/or second members may be threaded such that moving the first and second members relative to one another comprises rotating the first and/or second members.

The first and second members may be threadably coupled to one another such that moving the first and second members relative to one another comprises rotating the first and second members relative to one another.

Moving the first and second members relative to one another may comprise translating the first and second members relative to one another.

The translation of the first and second members may be hydraulically or pneumatically actuated.

The second member may be moved toward and away from the workpiece.

The first member may be moved so as to move the second member toward and away from the workpiece.

The method may further comprise, prior to de-bonding, checking the integrity of the bond by applying a predetermined force between the second member and the workpiece.

The predetermined force may be greater than the minimum required holding force and less than the fully cured failure strength of the bond. The minimum required holding force may set as the maximum possible force experienced in normal service.

The second member may be disposed inside the first member.

The second member may be set back from the first member so as to define a recess which receives a portion of the workpiece; and wherein, after breaking the bond between the first member and the workpiece, the second member may be advanced to remove residual adhesive from an inner surface of the recess.

The adhesive fastening element may comprise a plurality of first elements and/or a plurality of second elements.

In accordance with another aspect of the invention, there is provided an adhesive fastening element for holding a workpiece, the adhesive fastening element comprising: a first member; and a second member adjacent the first member and movable relative to the first member along a longitudinal axis of the adhesive fastening element; wherein, in use, an adhesive forms a bond between the workpiece and the first and second members with the second member in a first position, and wherein the second member is movable away from the first position to break the bond between the second member and the workpiece and is movable toward and past the first position so as to apply a force to the workpiece to break the bond between the first member and the workpiece and to de-bond the workpiece from the adhesive fastening element.

The first and/or second members may comprise a lead screw.

The first and second members may be threadably coupled to one another by complementary screw threads.

The first and/or second member may comprise a transparent portion.

The transparent portion may be an optical fibre or other UV transmitting material.

The first and/or second members may comprise an adhesive delivery tube.

The second member may be disposed inside the first member.

A plurality of first elements and/or a plurality of second elements may be provided.

The first position of the second member may be below the surface of the first member, thus defining a recess.

In accordance with another aspect of the invention, there is provided an adhesive fastening element comprising a plurality of pins; wherein the pins are independently movable along a longitudinal axis of the adhesive fastening element to define a three-dimensional surface of the fastening pin.

The pins may be configured so as to conform to the shape of a workpiece which is to be bonded to the surface of the adhesive fastening element.

The pins may have a hexagonal, triangular, circular cross-section or any combination.

Each pin may comprise a lead screw which is rotatable to move the pin. Alternatively, the pins may be moved by hydraulic or pneumatic means. Further still, the pins may be freely movable and locking means may be provided to fix the positions of the pins once they are in the desired position.

One or more of the pins may comprise an adhesive delivery tube. Furthermore, one or more of the pins may comprise a transparent portion. The transparent portion may be an optical fibre inside the pin and extending along its length. Furthermore, the pins may be provided with a transparent cap at the surface of the adhesive fastening element. The cap may be domed. Alternatively, a single sheet of transparent flexible material may be laid over the pins.

One or more of the pins may be connected to a light meter and light from the exterior surface of the adhesive fastening element may be transmitted to the light meter. A light source may be controlled in response to the amount of light received by the light meter.

Furthermore, a feedback loop between the light meter and the light source may be provided.

The light source may be prevented from being activated unless the light meter detects that a workpiece is in contact with the adhesive fastening element. Furthermore, the light meter may detect which of the pins are covered by the workpiece and the light source may only supply those pins which are covered.

The light meter may detect a change in the optical properties of the adhesive which occurs when the adhesive is cured.

The light source may be turned off when the light meter detects that the adhesive is cured.

In accordance with another aspect of the invention, there is provided an adhesive fastening element for holding a workpiece, the adhesive fastening element comprising: a light source for providing light to an exterior surface of the adhesive fastening element so as to cure an adhesive; and a light meter for receiving light from the exterior surface of the adhesive fastening element; wherein the light source is controlled in response to the amount of light received by the light meter.

Controlling the light source in response to the amount of light received by the light meter improves the safety and efficiency of the curing process.

The adhesive fastening element may further comprise a feedback loop between the light meter and the light source.

The light source may be prevented from being activated unless the light meter detects that a workpiece is in contact with the adhesive fastening element.

The light meter may detect a change in the optical properties of the adhesive which occurs when the adhesive is cured.

The light source may be turned off when the light meter detects that the adhesive is cured. This may ensure that the light source is activated for only the minimum time required to fully cure the adhesive.

The light source may comprise one or more LEDs.

The LEDs may comprise UV and/or Infrared LEDs.

The LEDs may be embedded in the adhesive fastening element and positioned at or near the exterior surface of the adhesive fastening element.

The adhesive fastening element may further comprise one or more optical fibres coupled to the light source for transmitting light to the exterior surface of the adhesive fastening element.

The adhesive fastening element may further comprise one or more optical fibres coupled to the light meter for transmitting light from the exterior surface of the adhesive fastening element to the light meter.

In accordance with another aspect of the invention there is provided an adhesive fastening element for holding a workpiece, the adhesive fastening element comprising: an exterior surface which receives the workpiece; and one or more LEDs embedded in the adhesive fastening element and positioned at or near the exterior surface of the adhesive fastening element.

The LEDs may be Infrared (IR) and/or Ultraviolet (UV) LEDs.

The LEDs may be used for curing an adhesive on the exterior surface of the adhesive fastening element in order to bond the workpiece to the adhesive fastening element. Furthermore, the LEDs may be used to generate heat in order to de-bond the workpiece from the adhesive fastening element. For example, the LEDs may be activated for approximately 20 seconds to cure the adhesive (with the temperature remaining below the de-bonding temperature) and approximately 40 seconds to obtain a sufficiently high temperature to de-bond the workpiece from the adhesive fastening element.

In accordance with another aspect of the invention, there is provided an adhesive fastening element for holding a workpiece, the adhesive fastening element comprising: an outer member; and a consumable inner member disposed inside the outer member and releasably movable relative to the outer member along a longitudinal axis of the adhesive fastening element; wherein the consumable inner member comprises a bonding surface which, in use, is bonded by an adhesive to the workpiece and is removed and replaced to detach the workpiece from the adhesive fastening element.

The consumable inner member may be an optical fibre.

The consumable inner member may be formed from Perspex or any other UV transmitting material.

The consumable inner member may be a thermoplastic adhesive fibre, such as a hot melt adhesive. The workpiece may be held in place through solidification of the hot melt adhesive.

The consumable inner member may comprise a plurality of portions.

The plurality of portions may be frangibly connected.

The adhesive fastening element may further comprise locking means for locking the position of the consumable inner member relative to the outer member.

In accordance with another aspect of the invention, there is provided a method for detaching a workpiece from an adhesive fastening element, the adhesive fastening element comprising: an outer member; and a consumable inner member disposed inside the outer member and releasably movable relative to the outer member along a longitudinal axis of the adhesive fastening element; wherein a bond is formed by an adhesive between the workpiece and a bonding surface of the inner member of the adhesive fastening element; the method comprising: detaching the workpiece from the adhesive fastening element with the bonding surface attached thereto; and replacing the bonding surface with another bonding surface for subsequent use.

The method may further comprise releasing the inner member and moving the inner member such that the workpiece is moved away from the outer member prior to detaching the workpiece from the adhesive fastening element.

The bonding surface may be replaced by providing the adhesive fastening element with a replacement consumable inner member.

The bonding surface may be replaced by removing a portion of the consumable inner member.

The portion of the consumable inner member may be removed by cutting the consumable inner member.

The portion of the consumable inner member may be removed by breaking a portion off the consumable inner member.

The method may further comprise advancing the consumable inner member by inserting a replacement portion into the outer member at the bottom of the inner member.

The consumable inner member may be an optical fibre.

The consumable inner member may be formed from Perspex or any other UV transmitting material.

The consumable inner member may be a thermoplastic adhesive fibre, such as a hot melt adhesive.

The method may further comprise, prior to detaching the workpiece from the adhesive fastening element, checking the integrity of the bond by applying a predetermined force between the inner member and the workpiece.

The predetermined force may be greater than the minimum required holding force and less than the fully cured failure strength of the bond. The minimum required holding force may set as the maximum possible force experienced in normal service.

In accordance with another aspect of the invention there is provided an adhesive fastening element for holding a workpiece, the adhesive fastening element comprising: a bonding surface for receiving an adhesive to bond the adhesive fastening element to the workpiece; and a heating element coupled to the bonding surface which is operable to heat the bonding surface so as to cure the adhesive and/or de-bond the workpiece from the adhesive fastening element.

The heating element may be embedded in the adhesive fastening element adjacent to the bonding surface.

The heating element may surround the adhesive fastening element.

The heating element may be separated from the bonding surface by a layer of thermally conductive and/or optically transparent material.

The material may be a glass ceramic or diamond material.

The heating element may comprise a resistive heating element.

The heating element may comprise an induction heating element.

The adhesive fastening element may have a core that comprises: electrically conductive elements which, in use, are heated by the induction heating element; and optically transparent elements for transmitting light to the bonding surface and adhesive.

The optically transparent elements may be encased by the electrically conductive elements. For example, the optically transparent elements may be glass rods which are encased by a metallic material having a high thermal conductivity and low thermal mass.

The heating element may comprise one or more LEDs.

The LEDs may comprise UV and/or Infrared LEDs.

In accordance with another aspect of the invention, there is provided an adhesive fastening element for holding a workpiece, the adhesive fastening element comprising:
a body defining a recess for receiving a protrusion of a workpiece; wherein, in use, adhesive is applied between an end surface of the recess and an end surface of the protrusion and between a side surface of the recess and a side surface of the protrusion to bond the workpiece to the adhesive fastening element.

At least a portion of the recess may be lined with a transparent element.

The end surface and the side surface of the recess may be lined with the transparent element.

An adhesive delivery tube may be embedded in the adhesive fastening element for supplying adhesive to the recess.

The body may comprise an outer member and an inner member disposed inside the outer member and movable relative to the outer member along a longitudinal axis of the adhesive fastening element; and the outer member may define the side surface of the recess and the inner member may define the end surface of the recess.

The adhesive may form a bond between the workpiece and the recess with the inner member in a first position; and the inner member may be movable away from the first position to break the bond between the inner member and the workpiece and may be movable toward and past the first position so as to apply a force to the workpiece to break the bond between the outer member and the workpiece and to de-bond the workpiece from the adhesive fastening element.

After breaking the bond between the outer member and the workpiece, the inner member may be advanced to remove residual adhesive from the side surface of the recess.

The inner and outer members may be threadably coupled to one another by complementary screw threads.

In accordance with another aspect of the invention, there is provided a method comprising: providing an adhesive fastening element, the adhesive fastening element comprising a body having a recess; inserting a protrusion of a workpiece into the recess of the adhesive fastening element; applying adhesive between the recess and the protrusion of the workpiece; aligning the workpiece with a reference point on the adhesive fastening element; and curing the adhesive to fix the position of the workpiece relative to the adhesive fastening element.

The recess of the adhesive fastening element and the protrusion of the workpiece may be complementary and interlock to align the workpiece.

The method may further comprise: transferring the adhesive fastening element and the workpiece from one manufacturing station to another manufacturing station.

The adhesive may be applied using an adhesive delivery tube embedded in the adhesive fastening element.

The body may comprise an outer member and an inner member disposed inside the outer member and movable relative to the outer member along a longitudinal axis of the adhesive fastening element.

The method may further comprise checking the integrity of the bond by applying a predetermined force between the inner member and the workpiece.

The predetermined force may be greater than the minimum required holding force and less than the fully cured failure strength of the bond. The minimum required holding force may set as the maximum possible force experienced in normal service.

The method may further comprise: moving the inner and outer members relative to one another such that the inner member moves away from the workpiece so as to break the bond between the inner member and the workpiece; and moving the inner and outer members relative to one another such that the inner member moves towards the workpiece and applies a force to the workpiece so as to break the bond between the outer member and the workpiece, and to de-bond the workpiece from the adhesive fastening element.

After breaking the bond between the outer member and the workpiece, the inner member may be advanced to remove residual adhesive from a side surface of the recess.

A workholding device may comprise one or more of the adhesive fastening elements described above.

Providing a workholding device with a plurality of adhesive fastening elements may allow the workpiece to be more strongly held.

BRIEF DESCRIPTION OF THE DRAWINGS

For a better understanding of the present invention, and to show more clearly how it may be carried into effect, reference will now be made by way of example, to the following drawings, in which.

DETAILED DESCRIPTION

Figure 1:
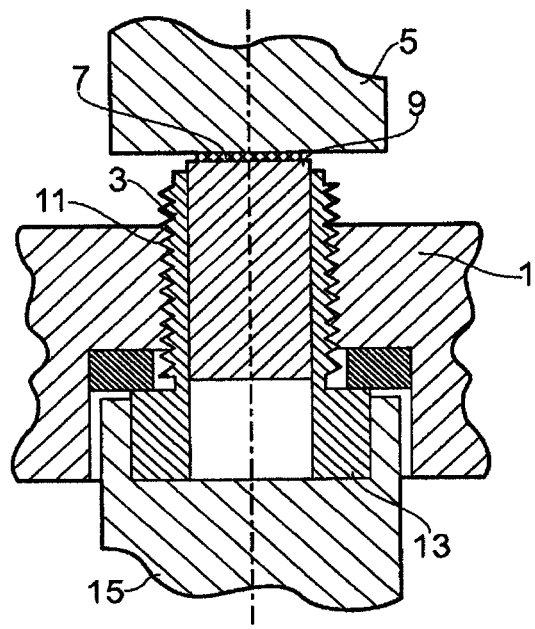
FIG. 1 is a cross-sectional view of a prior art adhesive fastening element.
Figure 2:
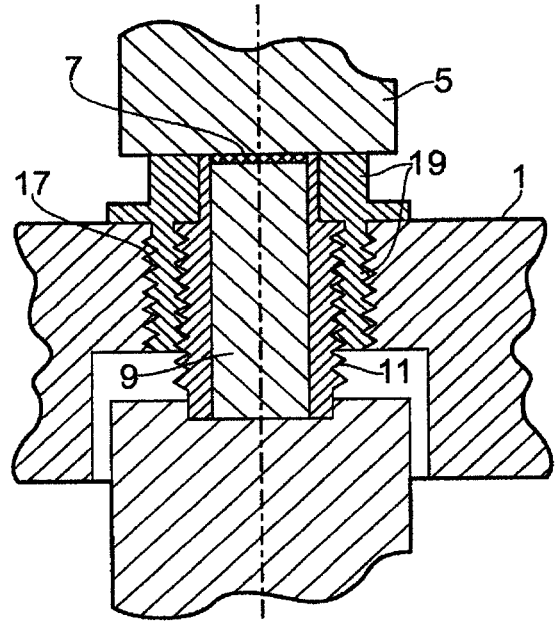
FIG. 2 is a cross-sectional view of another prior art adhesive fastening element.
Figure 3:
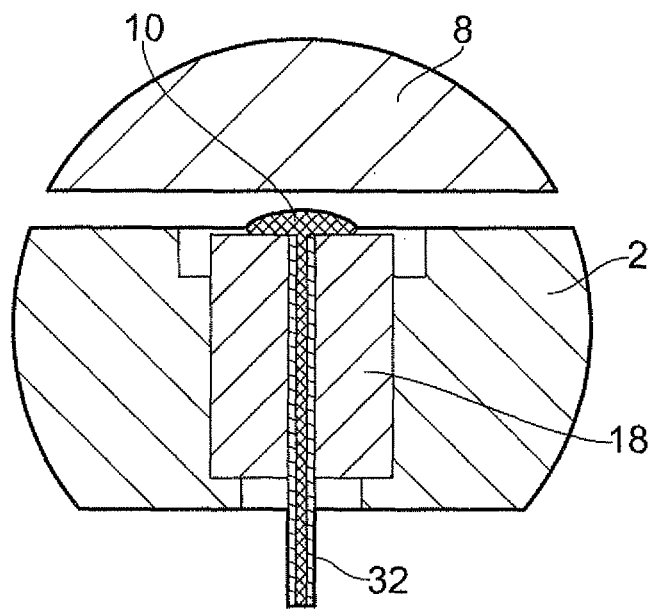
FIG. 3 is a cross-sectional view of an embodiment of an adhesive fastening element having an adhesive delivery tube in accordance with an aspect of the invention.

With reference to FIG. 3, an embodiment of an adhesive fastening element 2 in accordance with an aspect of the invention is shown. The adhesive fastening element 2 comprises a core formed from an optical material 18. An adhesive delivery tube 32 is embedded in the adhesive fastening element 2 and extends through the optical material 18. The adhesive delivery tube 32 provides a conduit for supplying a photo-activated adhesive 10 to an exterior surface of the adhesive fastening element 2 where it may be used to bond a workpiece 8 to the adhesive fastening element 2.

The adhesive 10 is pumped through the adhesive delivery tube 32 using a suitable pumping means (not shown). Once a sufficient amount of adhesive has been supplied to the surface of the adhesive fastening element 2, a bond may be formed between the adhesive fastening element 2 and the workpiece 8 by supplying light to the adhesive 10 through the optical material 18 to cure the photo-activated adhesive 10. In this regard, the adhesive delivery tube 32 is configured to prevent the adhesive 10 from curing within the adhesive delivery tube 32 itself. This is achieved by making the adhesive delivery tube 32 opaque so that only the adhesive 10 on the surface of the adhesive fastening element 2 is exposed to light and thus cured. The adhesive 10 in the adhesive delivery tube 32 will remain uncured and therefore ready for subsequent use.

Although the adhesive fastening element 2 has been described with reference to a photo-activated adhesive 10, any other known adhesive may be used. Accordingly, alternative or additional means may be provided to prevent the adhesive 10 from curing within the adhesive delivery tube 32 itself. Where the adhesive 10 is not a photo-activated adhesive it is not necessary to provide the optical material 18.

For example, where the adhesive 10 is an anaerobic adhesive, the adhesive delivery tube 32 may be formed of a non-metal material which has a relatively large internal diameter to prevent the adhesive 10 from curing within the adhesive delivery tube 32.

Similarly, cyanoacrylates will not cure within such a tube since there is an absence of moisture. Adhesives that use an activating catalyst will not be cured in the adhesive delivery tube 32 where the activator does not reach.

Upon the breakage of the bond, all of the cured adhesive 10 is removed from the adhesive fastening element 2 leaving the adhesive delivery tube 32 clear for subsequent use.

Figure 4:
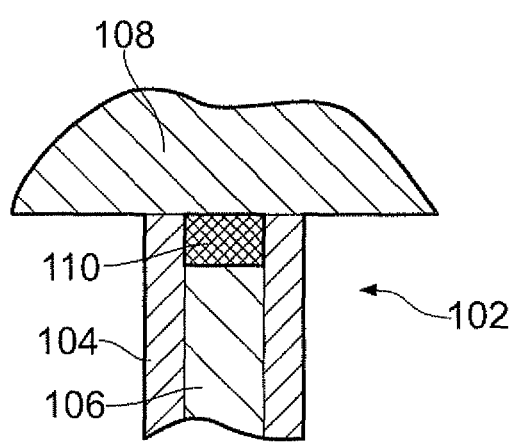
FIG. 4 is a cross-sectional view of an embodiment of an adhesive fastening element having inner and outer members shown bonded to a workpiece in accordance with another aspect of the invention.

With reference to FIG. 4, an embodiment of an adhesive fastening element 102 in accordance with another aspect of the invention is shown. The adhesive fastening element 102 comprises an outer member 104 and an inner member 106. The inner member 106 is disposed within the outer member 104 and is movable relative to the outer member 104 along a longitudinal axis of the adhesive fastening element 102.

In use, a workpiece 108 is held by the adhesive fastening element 102. Specifically, the inner member 106 is positioned such that it is spaced away from an end of the outer member 104. This forms a recess which receives an adhesive 110. The adhesive 110 may be any known adhesive. The adhesive 110 forms a bond between the workpiece 108 and the outer and inner members 104, 106. Accordingly, the adhesive fastening element 102 holds the workpiece 108 still whilst performing manufacturing processes, such as machining, or whilst inspecting the workpiece 108.

Prior to the manufacturing process or inspection of the workpiece 108, the integrity of the adhesive bond may be checked by applying a predetermined force between the inner member 106 and the workpiece 108. The predetermined force is between the minimum required holding force required by the operation and the fully cured failure strength of the bond.

Figure 5:
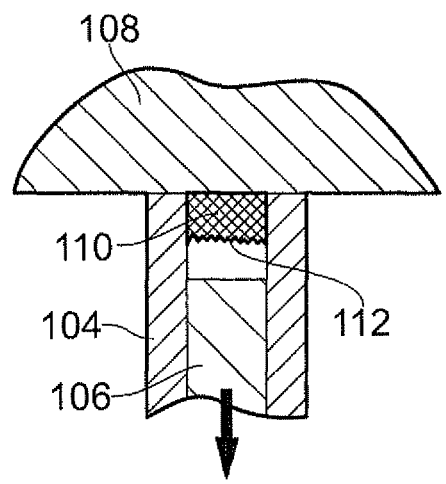
FIG. 5 is a cross-sectional view of the adhesive fastening element of FIG. 4 after a first stage of a de-bonding process in accordance with another aspect of the invention.
Figure 6:
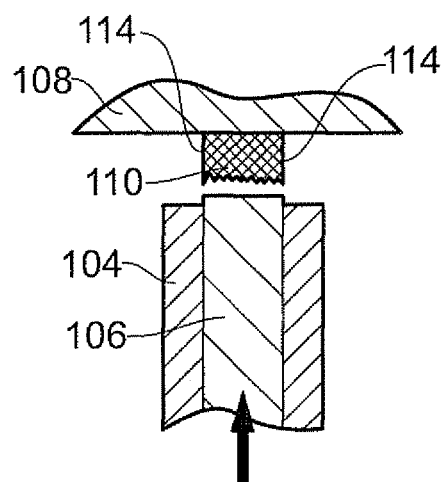
FIG. 6 is a cross-sectional view of the adhesive fastening element of FIG. 4 after a second stage of the de-bonding process.

In order to de-bond the workpiece 108 from the adhesive fastening element 102, a de-bonding process in accordance with another aspect of the invention is used, as shown in FIGS. 5 and 6.

In a first stage of the de-bonding process, as shown in FIG. 5, the inner member 106 is moved away from the workpiece 108 in order to break the bond 112 between the inner member 106 and the adhesive 110.

During this first stage, the workpiece 108 is supported by the outer member 104. Furthermore, the workpiece 108 is supported by the adhesive 110 since the adhesive 110 remains bonded to the outer member 104. Accordingly, following the first stage of the de-bonding process, the workpiece 108 remains bonded to the outer member 104.

In a second stage of the de-bonding process, as shown in FIG. 6, the inner member 106 is moved in the opposite direction, back towards the workpiece 108, until it contacts the adhesive 110. The inner member 106 is then forced upwards to break the bond 114 between the adhesive 110 and the outer member 104, thus de-bonding the workpiece 108 from the adhesive fastening element 102.

The adhesive 110 remains bonded to the workpiece 108; however, where required, the residual adhesive may be removed using conventional methods. The method used may be chosen to suit the type of adhesive used. For example, the method may include: chemical agents, abrasion, hot water bath or other media hot bath, peeling off, water soluble adhesive, laser cleaning, ultrasonic cleaning, etc.

The actuation of the inner member 106 in the first and second stages of the de-bonding process may be caused by any known arrangement. For example, the inner member 106 may be actuated by pneumatic or hydraulic means, or through the use of cooperating screw threads on the outer and inner members 104, 106.

Figure 7:
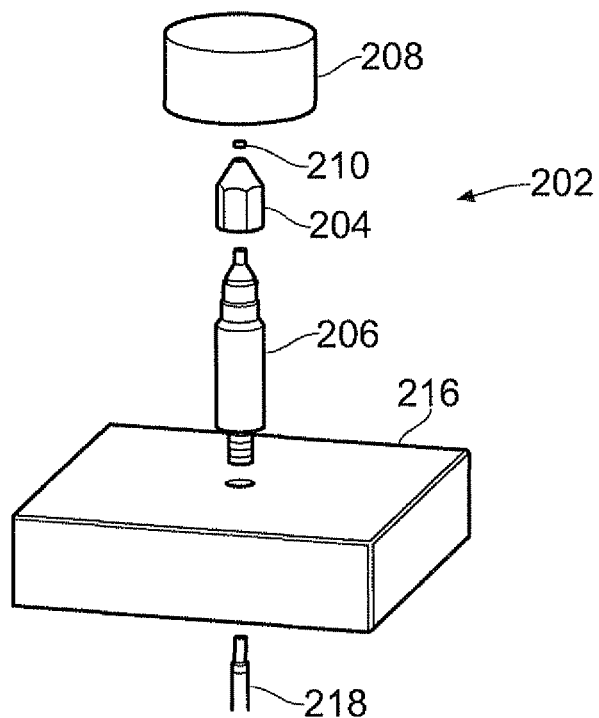
FIG. 7 is an exploded perspective view of another embodiment of an adhesive fastening element having inner and outer members.
Figure 8:
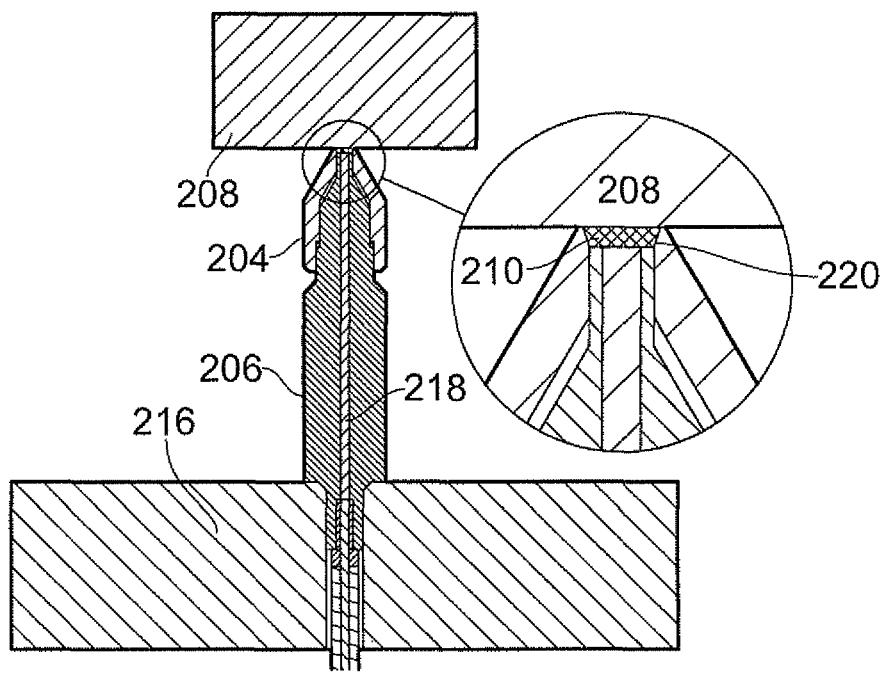
FIG. 8 is a cross-sectional view of the adhesive fastening element of FIG. 7 shown bonded to a workpiece.

FIGS. 7 and 8 show another embodiment of an adhesive fastening element 202. In this embodiment the outer member 204 tapers towards one end. Accordingly, the adhesive fastening element 202 is particularly suitable for inspection purposes since it provides maximum accessibility to the workpiece surfaces.

The adhesive fastening element 202 is threadably coupled to a base plate 216. Furthermore, the outer and inner members 204, 206 are threadably coupled to one another. The adhesive 210 used in this embodiment is a photo-activated adhesive (e.g. UV curable adhesive, such as Dymax 6-621). In this regard, the inner member 206 is provided with an optical material 218 (e.g. a fibre optic or fibre optic bundle made of Perspex or glass) which passes through the centre of the inner member 206 and provides a conduit for transmitting light to the adhesive 210 so as to cure the adhesive 210 and to form a bond between the workpiece 208 and the adhesive fastening element 202.

In order to de-bond the workpiece 208 from the adhesive fastening element 202, the outer member 204 is rotated relative to the inner member 206. This causes the outer member 204 to translate relative to the inner member 206, thus breaking the bond 212 between the inner member 206 and the adhesive 210. Subsequently, the outer member 204 is rotated in the opposite direction to break the bond 214 between the adhesive 210 and the outer member 204, thus de-bonding the workpiece 208 from the adhesive fastening element 202.

A portion 220 of an inner surface of the outer member 204 is tapered such that the recess into which the adhesive 210 is received is wider at an end adjacent the workpiece 208 than at an end adjacent the inner member 206. This arrangement encourages the bond 212 to break between the inner member 206 and the adhesive 210 during the first stage of the de-bonding process. Furthermore, the tapering structure allows the adhesive 210 to be forced out of the outer member 204 during the second stage of the de-bonding process.

Figure 9:
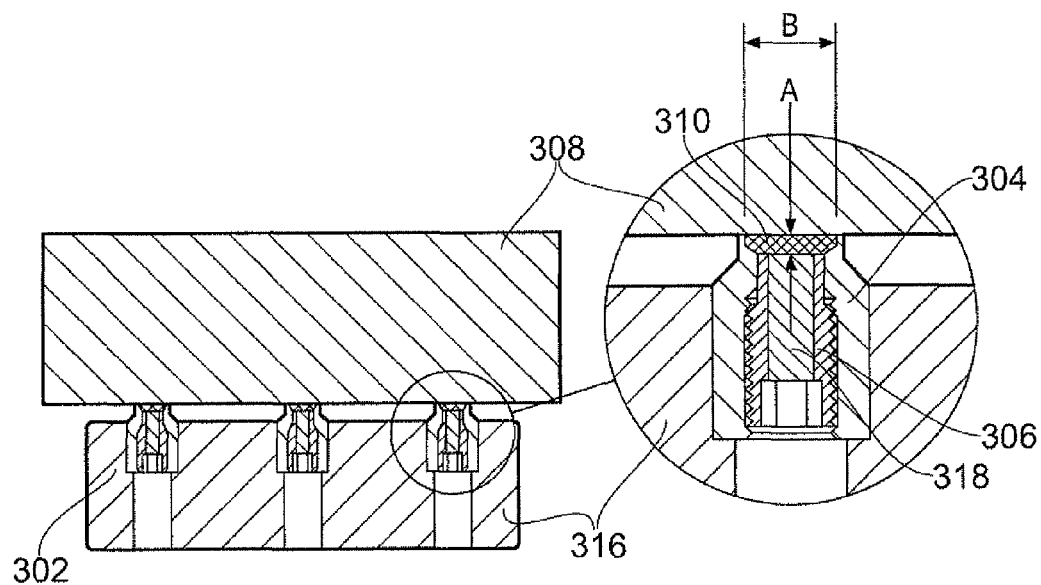
FIG. 9 is a cross-sectional view of a workholding device comprising a plurality of adhesive fastening elements having inner and outer members.

FIG. 9 shows a workholding device comprising a plurality of adhesive fastening elements 302 which operate in a similar manner as the adhesive fastening element described previously with reference to FIG. 4.

Specifically, each of the adhesive fastening elements 302 comprises an outer member 304 and an inner member 306. The inner member 306 is disposed within the outer member 304 and is threadably coupled to the outer member 304 by complementary screw threads. Accordingly, the inner member 306 is movable relative to the outer member 4 along a longitudinal axis of the adhesive fastening element 302 through the rotation of the inner member 306.

The adhesive 310 is a photo-activated adhesive, and thus the inner member 306 is provided with an optical material 318 which passes through the centre of the inner member 306 and provides a conduit for transmitting light to the adhesive 310 so as to cure the adhesive 310 and to form a bond between the workpiece 308 and the adhesive fastening element 303.

To de-bond the workpiece 308 from the adhesive fastening elements 302, the process shown in FIGS. 5 and 6 is used. The inner member 306 is therefore screwed so as to translate the inner member 306 away from the workpiece 308 and to break the bond between the inner member 304 and the adhesive 310.

The rotation of the inner member 306 is subsequently reversed in order to move the inner member 306 back towards the workpiece 308, until it contacts the adhesive 310. The inner member 306 is then further rotated so as to force the adhesive 310 upwards and to break the bond between the adhesive 310 and the outer member 304, thus de-bonding the workpiece 308 from the adhesive fastening element 302.

The de-bonding process may be carried out simultaneously for all of the adhesive fastening elements 302 or consecutively.

Although the actuation of the inner member 306 in the first and second stages of the de-bonding process has been described as being caused by cooperating screw threads, the inner member 306 may be actuated by other means. The workholding device may use any of the adhesive fastening elements described herein. Furthermore, although this embodiment, and that of FIGS. 7 and 8, have been described as using a photo-activated adhesive, this is not necessary, and any known adhesive could be used, thus removing the need for the optical material 218, 318.

For example, thermally cured adhesives, such as epoxies, may be used. Such adhesives can provide a very high bonding strength; however the curing time is generally longer than for photo-activated adhesives.

Furthermore, a chemical activating catalyst, which can be applied to the workpiece at the point of contact, may be used to cure the adhesive joint. The high strength, structural adhesive Dymax 6-621 is able to be cured in multiple ways (i.e. UV cured, thermally cured or cured with an activator) and thus provides flexibility in the bonding process.

Anaerobic adhesives will only cure when in contact with the surface of a metal type adhesive fastening element when the workpiece is brought into contact to remove the air and produce a thin joint cross-section. Cyanoacrylates (super glue type adhesives) cure almost instantaneously through a reaction with moisture on the adhesive fastening element surface.

The ratio of dimensions (A:B in FIG. 9) is used to control the point at which the adhesive joint first breaks with larger ratios causing the adhesive to break first, away from the workpiece. There is however a limit on the maximum thickness of some adhesives which can limit the size of dimension (A). As a result an array of inner members may be used to overcome this issue.

Figure 10:
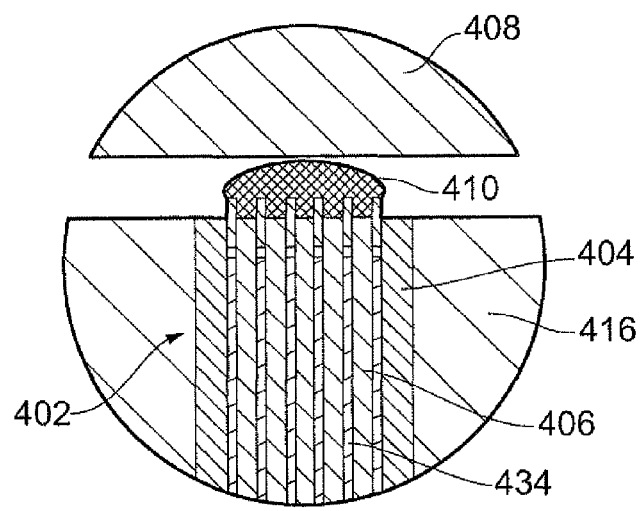
FIG. 10 is a cross-sectional view of another embodiment of an adhesive fastening element having a plurality of inner members.
Figure 11:
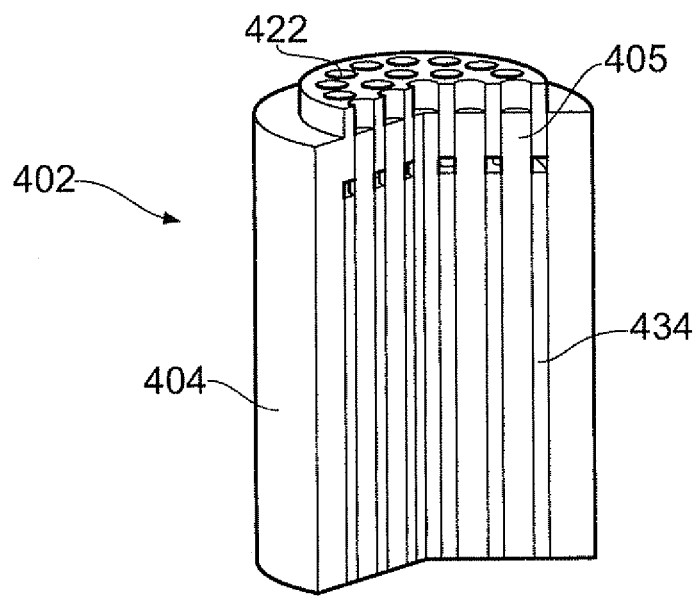
FIG. 11 is a cutaway perspective view of the adhesive fastening element of FIG. 10.

FIGS. 10 and 11 show another embodiment of an adhesive fastening element 402 which employs a plurality of inner members 406.

An outer member 404 of the adhesive fastening element 402 is provided with a plurality of holes 422 which receive the inner members 406. Each of the inner members 406 is movably located within one of the holes 422. The holes 422 may extend through the entire length of the outer member 404 or, as shown in FIGS. 10 and 11, extend through only a portion of the outer member 404. In use, the holes 422 act to guide the inner members 406. Furthermore, the holes 422 in conjunction with the inner members 406 form a plurality of recesses for receiving a portion of adhesive 410.

The workpiece 408 may be de-bonded from the adhesive fastening element 402 using the de-bonding process shown in FIGS. 5 and 6.

Accordingly, in a first stage of the de-bonding process, the inner members 406 are moved away from the workpiece 408 in order to break the bond between the inner members 404 and the adhesive 410.

In a second stage of the de-bonding process, the inner members 406 are moved in the opposite direction, back towards the workpiece 408, until they contact the adhesive 410. The inner members 406 are then forced upwards to break the bond between the adhesive 410 and the outer member 404, thus de-bonding the workpiece 408 from the adhesive fastening element 402.

The inner members 406 are separated from one another by a bearing element 434 which allows the inner members to slide freely within the adhesive fastening element 402.

The plurality of inner members 406 may be connected to one another such that they move in unison. Alternatively, the inner members 406 may be individually actuated.

Figure 12:
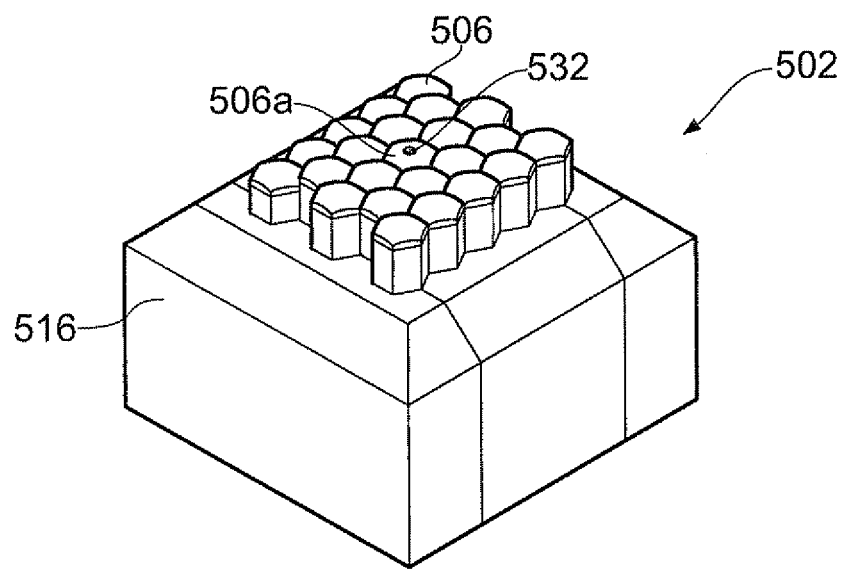
FIG. 12 is a perspective view of another embodiment of an adhesive fastening element having a plurality of movable pins.
Figure 13:
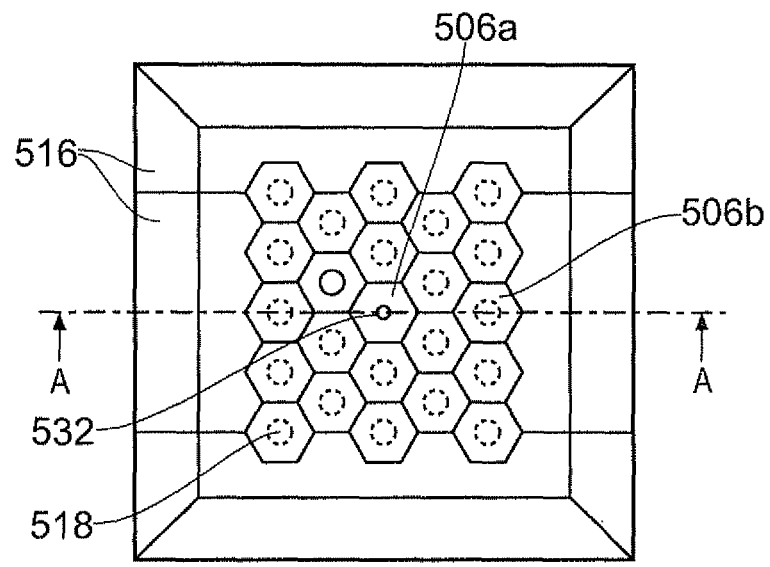
FIG. 13 is a top view of the adhesive fastening element of FIG. 12.
Figure 14:
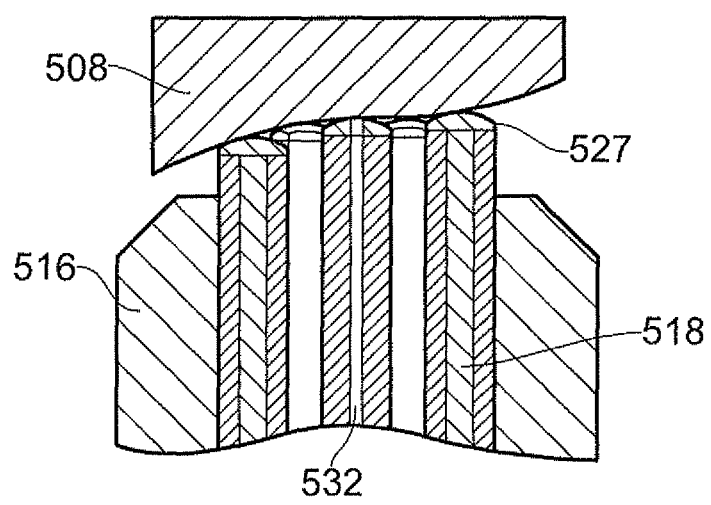
FIG. 14 is a cross-sectional view of the adhesive fastening element through the plane A-A shown in FIG. 13.

FIGS. 12 to 14 show another embodiment of an adhesive fastening element 502. The adhesive fastening element 502 comprises a plurality of pins 506 disposed within an opening in a body or base plate 516. The pins 506 are individually movable relative to one another and relative to the base plate 516. The base plate 516 may be formed from several sections (see FIG. 13) which allow the size and shape of the opening, and thus the number and shape of the pins 506 to be changed, depending on the application.

As shown particularly in FIG. 13, the pins 506 have a hexagonal cross-section so as to eliminate gaps between the pins 506.

A central pin 506a is provided with an adhesive delivery tube 532 which extends along a longitudinal axis of the pin 506a. The adhesive delivery tube 532 supplies an photo-activated adhesive to the interface between the adhesive fastening element 502 and the workpiece 508 (see FIG. 14).

The other pins 506b each comprise an optical material 518 (e.g. a fibre optic or fibre optic bundle made of Perspex or glass) at the centre of the pin 506b and extending along the longitudinal axis of the pin 506b. The optical material 518 transmits light (e.g. UV light) from a light source to the surface of the adhesive fastening element 502.

Each pin 506 is provided with a domed cap 527 formed from an optically transparent material. The cap 527 dissipates the light from the optical material 518 across the entire interface between the adhesive fastening element 502 and the workpiece 508.

The outer portion of the pins 506 surrounding the optical material 518 or adhesive delivery tube 532 may be formed from hardened steel.

In use, the pins 506 are moved relative to the base plate 516 and relative to one another in order to conform to the three-dimensional surface of the workpiece 508, as shown in FIG. 14.

Each pin 506 may be attached to the base plate 516 by a lead screw. The shank of the screw may be aligned with the longitudinal axis of the pin 506 and adjacent pins may prevent rotation of the pin 506 such that rotation of the screw causes the pin 506 to move up or down (i.e. along the longitudinal axis of the pin). Alternatively, the movement of the pins 506 may be actuated by hydraulic, pneumatic or other such means.

On the other hand, the pins 506 may be allowed to move freely until they are appropriately positioned. The pins 506 may then be locked in this position by applying a lateral force to the pins. This force could be applied by the base plate 516 through adjustment of the positions of the sections which form the base plate 516.

With the workpiece 508 in place, the adhesive delivery tube 532 of the central pin 506a supplies adhesive to the surface of the adhesive fastening element 502. The adhesive is then cured using the optical material 518 of the other pins 506b to form a joint between the adhesive fastening element 502 and the workpiece 508.

De-bonding of the workpiece 508 from the adhesive fastening element 502 is carried out in two stages. In the first stage of the de-bonding process, some but not all of the pins 506 are moved away from the workpiece 508 in order to break the bond between the pins 506 and the adhesive 510. During this first stage, the workpiece 508 is supported by the remaining pins 506. Of course, the pins 506 de-bonded during the first stage may be de-bonded separately, rather than simultaneously.

In the second stage of the de-bonding process, the already de-bonded pins 506 are moved in the opposite direction, back towards the workpiece 508, until they contact the adhesive 510. The pins 506 are then forced upwards to break the bond between the adhesive 510 and the remaining pins 506, thus de-bonding the workpiece 508 from the adhesive fastening element 502.

The pins 506 de-bonded during the first stage may surround the pins 506 de-bonded during the second stage, or vice-versa. Alternatively, the pins de-bonded in the first stage may be distributed evenly across the surface of the adhesive fastening element 502 so as to provide maximum support to the workpiece 508 and to minimise the stress induced in the workpiece 508.

Although the pins 506 have been described as having a hexagonal cross-section, other cross-sectional shapes may be employed such as triangular, circular, or any other shape. Furthermore, it is not necessary for all of the pins 506 to have the same cross-section.

The caps 527 may allow light to be transmitted between adjacent pins 506. Accordingly, it may not be necessary to provide each of the pins 506b with optical material 518. Furthermore, the caps 527 need not be domed and could instead be flat, angled or any other shape. Indeed, the caps 527 may be removed altogether, with the optical material 518 and the outer portion of the pin 506 forming the surface of the pin 506. Here, it is desirable to maximise the size of the optical material 518 so as to provide light to the entire surface of the adhesive fastening element 502. Alternatively, the caps 527 may be replaced by a single sheet of thin, flexible, transparent material (such as PMMA or polycarbonate) which lies over the surface of the pins 506, with the adhesive disposed between the thin sheet and the workpiece 508. The sheet would be de-bonded from the workpiece 508 as the pins 506 are moved.

A plurality of pins 506a may have adhesive delivery tubes 532, were required. These pins 506a may be distributed throughout the array of pins in order to uniformly distribute the adhesive across the interface between the adhesive fastening element 502 and the workpiece 508. Alternatively, the pins 506a may be grouped together in the centre of the adhesive fastening element 502.

Although this embodiment has been described as using a photo-activated adhesive, this is not necessary, and any known adhesive could be used, thus removing the need for the optical material 518 and caps 527.

Furthermore, the optical material 518 of one or more of the pins 506 may be connected to a light meter and light from the surface of the adhesive fastening element 502 may be transmitted to the light meter. The light source may be controlled in response to the amount of light received by the light meter using a feedback loop between the light meter and the light source.

The light source may be prevented from being activated unless the light meter detects that a workpiece is in contact with the adhesive fastening element. Furthermore, the light meter may detect which of the pins are covered by the workpiece and the light source may only supply those pins which are covered.

The light meter may detect a change in the optical properties of the adhesive which occurs when the adhesive is cured. Accordingly, the light source may be turned off when the light meter detects that the adhesive is cured.

Figure 15:
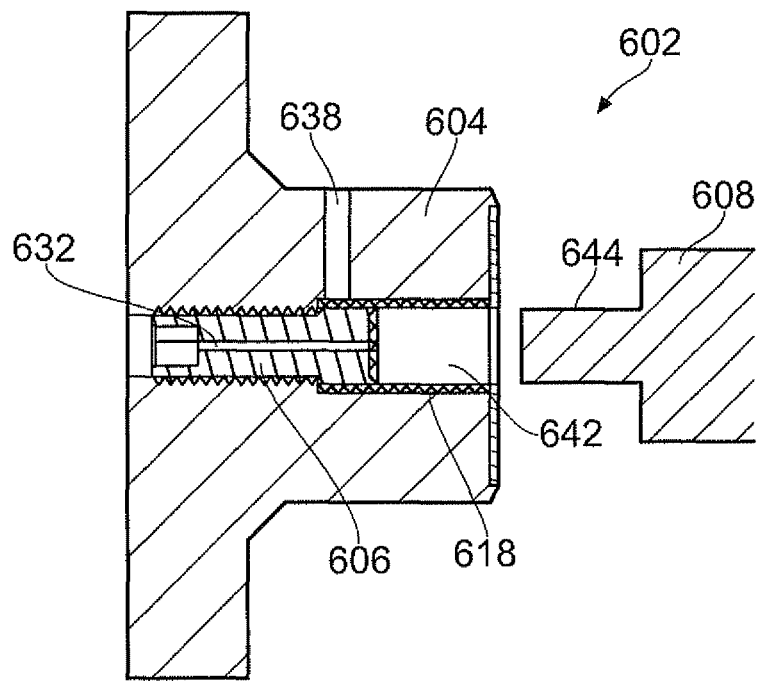
FIG. 15 is a cross-sectional view of another embodiment of an adhesive fastening element having inner and outer members.

FIG. 15 shows another embodiment of an adhesive fastening element 602. The adhesive fastening element 602 comprises a body or outer member 604 and an inner member 606. The inner member 606 is disposed within a chamber formed in the outer member 604 and is movable relative to the outer member 604 along a longitudinal axis of the adhesive fastening element 602.

The chamber formed in the outer member 604 may have an internal cross-section which is circular, however other shapes may be used, such as triangular, square, pentagonal, hexagonal or irregular. The latter arrangements may provide a fixed orientation between the workpiece and the adhesive fastening element 602. Additionally, or instead, the adhesive fastening element 602 may be provided with location features which interlock with complementary features of the workpiece (for example, dowels and holes) to define the location of the workpiece relative to the adhesive fastening element 602.

The chamber is lined along at least a portion of its length with a transparent element 618. The transparent element 618 is tubular and hollow and the inner member 606 moves within the transparent element 618. A passageway 638 is formed in the side of the outer member 604 which allows light to be transmitted from a light source (e.g. a UV light source; not shown), along the passageway (or an optical fibre), and to the transparent element 618. Furthermore, a portion of the inner member 606 may be formed from an optical material to allow light to be transmitted across the surface of the inner member 606.

The transparent element 618 is retained within the opening of the outer member 604 by a cover plate 640 which is fixed to the surface of the outer member 604. The cover plate 640 also protects the transparent element 618 from impact related damage.

The inner member 606 is provided with an adhesive delivery tube 632 which extends along a longitudinal axis of the inner member 606. The adhesive delivery tube 632 supplies an photo-activated adhesive to the surface of the inner member 606.

The inner member 606 is set so as to define a recess 642. The recess 642 corresponds to a protrusion 644 provided on the workpiece 608. Accordingly, the protrusion 644 is received within the recess 642 such that the protrusion abuts with the surface of the inner member 606.

The insertion of the protrusion 644 causes some of the adhesive at the surface of inner member 606 to be forced around the protrusion 644 between the protrusion 644 and the transparent element 618.

The adhesive is then cured using the light source to create a bond between the adhesive fastening element 602 and the workpiece 608. Specifically, a bond is formed between the inner member 606 and the protrusion 644 and a bond is formed between the transparent element 618 of the outer member 604 and the protrusion 644. Such a joint can withstand greater loads than a butt joint.

The adhesive may be cured only when the workpiece 608 is appropriately aligned with the fastening element 602. Accordingly, the adhesive fastening element 602 may act as a reference datum for manufacturing operations. Furthermore, the adhesive fastening element 602 can be used as a carrier for transporting the workpiece 608 between manufacturing stations. Each manufacturing station is configured to receive the adhesive fastening element 602 with the workpiece 608 attached. The manufacturing process performed at each station is coordinated with respect to the reference datum provided by the adhesive fastening element 602. Once all of the required operations have been performed on the workpiece 608, the workpiece 608 can be de-bonded from the adhesive fastening element 602. The adhesive fastening element 602 can then be reused.

The protrusion 644 of the workpiece 608 need not be accurately machined since the adhesive mitigates for deviations in its geometry. The workpiece 608 and the protrusion 644 may be formed using, for example, a simple forging process. Provided the orientation of workpiece 608 relative to the adhesive fastening element 602 is known, the manufacturing operations can be performed accurately. This is particularly advantageous in applications where the workpiece 608 is a blank which is to undergo machining operations whilst held by the adhesive fastening element 602 to form the final component.

De-bonding of the workpiece 608 from the adhesive fastening element 602 is carried out in two stages. In a first stage of the de-bonding process, the inner member 606 is moved away from the workpiece 608 in order to break the bond between the inner member 606 and the protrusion 644.

During this first stage, the workpiece 608 is supported by the outer member 604 and the bond between the transparent element 618 and the protrusion 644. Accordingly, following the first stage of the de-bonding process, the workpiece 608 remains bonded to the transparent element 618.

In a second stage of the de-bonding process, the inner member 606 is moved in the opposite direction, back towards the protrusion 644, until it contacts the protrusion 644. The inner member 606 is then forced upwards to break the bond between the transparent element 618 and the protrusion 644, thus de-bonding the workpiece 608 from the adhesive fastening element 602. The inner member 606 has a sharp leading edge and fits closely within the chamber. Consequently, the action of the inner member 606 also acts to scrape the residual adhesive from the surface of the transparent element 618, leaving the adhesive fastening element 602 ready for subsequent use.

The actuation of the inner member 606 in the first and second stages of the de-bonding process may be caused by any known arrangement. For example, the inner member 606 may be actuated through the use of cooperating screw threads on the outer and inner members 604, 606, as shown in FIG. 15, or by pneumatic or hydraulic means.

In an alternative embodiment, the transparent element 618 may taper along its length. Similarly, the protrusion 644 may have a corresponding taper. With this arrangement, the inner member 606 is unable to remove residual adhesive from the transparent element and may therefore only be required to move sufficiently in order break the bond between the workpiece 608 and the adhesive fastening element 602 (for example, approximately 1 mm in each direction).

Figure 16:
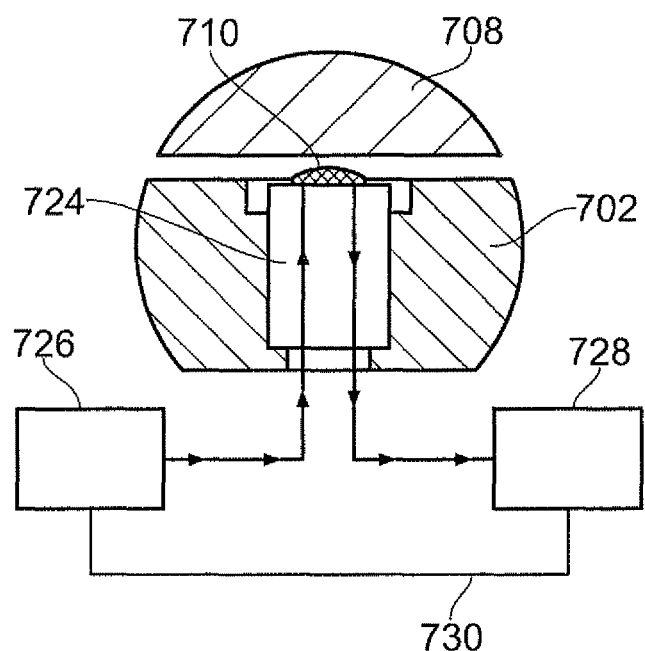
FIG. 16 is a cross-sectional view of an embodiment of an adhesive fastening element having a light source and a light meter in accordance with another aspect of the invention.

With reference to FIG. 16, an embodiment of an adhesive fastening element 702 in accordance with another aspect of the invention is shown. The adhesive fastening element 702 comprises a core formed by a plurality of optical fibres 724. Indeed, the optically transparent material of any of the embodiments described herein may be formed by a plurality of optical fibres.

One or more of the optical fibres 724 are coupled to a light source 726. The optical fibres 724 therefore provide a conduit for transmitting light from the light source 726 to an exterior surface of the adhesive fastening element 702. Accordingly, the light source 726 is able to cure a photo-activated adhesive disposed on the adhesive fastening element 702.

In addition, one or more of the optical fibres 724 are coupled to a light meter 728. The optical fibres 724 therefore provide a conduit for transmitting light from the exterior surface of the adhesive fastening element 702 to the light meter 728. The light meter 728 therefore provides a light intensity reading at the joint interface. A feedback loop 730 is provided between the light meter 728 and the light source 726.

In use, the feedback loop 730 allows the output of the light source 726 to be controlled in response to the amount of light received by the light meter 728.

For example, the light meter 728 may detect a change in the optical properties of the adhesive 710 which occurs when the adhesive is cured. For instance, the transparency of the adhesive 710 may change as it cures. Furthermore, adhesives are available which change colour when they are cured and the light meter 728 may detect this change.

When the light meter 728 detects that the adhesive 710 is cured, the light source 726 may be turned off. Such feedback may ensure consistent curing of the adhesive 710 and/or optimised curing time.

Alternatively, or in addition, the light source 726 may be prevented from being activated unless the light meter 728 detects that a workpiece is in contact with the adhesive fastening element 702 (i.e. the amount of light received by the light meter 728 will reduce in the presence of the workpiece 728). This therefore provides a safety interlock.

The light source 726 may be provided by one or more LEDs which are coupled to the optical fibres 724. In another embodiment, the LEDs may be embedded at or close to the exterior surface of the adhesive fastening element 702, thereby removing the need for the optical fibres 724 to transmit the light to the surface. Nevertheless, one or more of the optical fibres 724 may be retained for transmitting light from the exterior surface of the adhesive fastening element 702 to the light meter 728. Alternatively, the light meter 728 may also be located at or close to the exterior surface of the adhesive fastening element 702.

The LEDs may be an Infrared (IR) or Ultraviolet (UV) LEDs, or a combination of IR and UV LEDs.

The LEDs can be used to cure the adhesive 710 on the exterior surface of the adhesive fastening element 702 in order to bond the workpiece to the adhesive fastening element 702. For example, a UV LED may be used for curing UV adhesive.

The incorporation of a UV LED into the adhesive fastening element 702 provides the benefit of removing the need for a UV curing lamp and provides a more self contained system. Furthermore, using LED technology controls the wavelength of light more tightly and therefore reduces the risk of harmful far-UV wavelengths being emitted. Consequently, the adhesive fastening element 702 is safer to operate.

Although the outputted power of an LED is lower than a UV lamp which can increase cure times, they can be used in an array making them more suitable for larger cure areas.

Furthermore, the LEDs may be used to generate heat in order to de-bond the workpiece from the adhesive fastening element 702. The heat may be managed using a CVD diamond based arrangement, such as a heat spreader.

The thermal effects in the adhesive fastening element can be controlled by: a thermal management system, the wavelength or intensity output rating of the LED, the power level applied to the LEDs, the LED type (UV/IR), and the adhesive type (for example, the lower strength Speedmask® UV adhesive may be curable and de-bondable using inexpensive, off the shelf, UV LEDs that can operate up to 120° C.).

Furthermore, LEDs are being developed which can emit a deep UV light of a wavelength around 235 nm and can operate at temperatures as high as 420° C. and which are stable and do not break down below approximately 600° C.

The LEDs may be activated for approximately 20 seconds to cure the adhesive (with the temperature remaining below the de-bonding temperature) and approximately 40 seconds to obtain a sufficiently high temperature to de-bond the workpiece from the adhesive fastening element. At this temperature, the workpiece can be easily removed from the adhesive fastening element by hand and residual adhesive can be removed from the workpiece.

A combination of UV and IR LEDs may be used to provide curing and de-bonding respectively.

Figure 17:
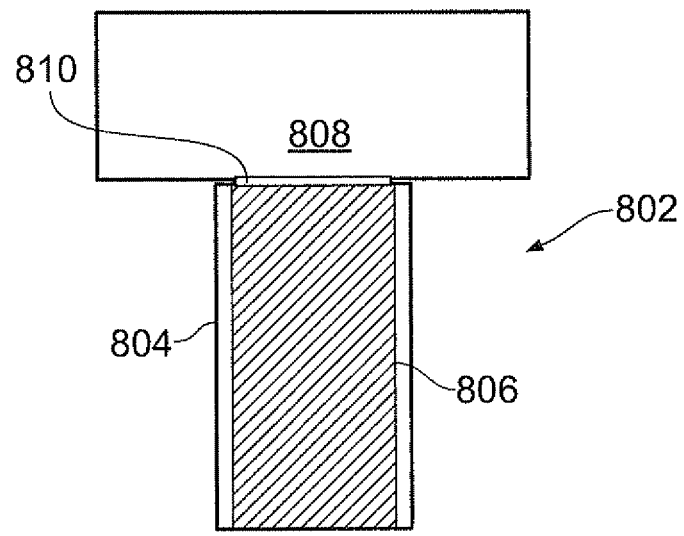
FIG. 17 is a cross-sectional view of an embodiment of an adhesive fastening element having a consumable inner member shown bonded to a workpiece in accordance with another aspect of the invention.

With reference to FIG. 17, an embodiment of an adhesive fastening element 802 is shown in accordance with another aspect of the invention is shown. The adhesive fastening element 802 comprises an outer member 804 and an inner member 806. The inner member 806 is disposed within the outer member 804 and is movable relative to the outer member 804 along a longitudinal axis of the adhesive fastening element 802. The inner member 806 is a consumable element, i.e. at least a portion of the inner member 806 is consumed during each use and the inner member 806 is replaced, as will be described in more detail below.

The adhesive fastening element 802 further comprises locking means which selectively lock the position of the inner member 806 relative to the outer member 804. The locking means may be provided by the outer member 804 itself, which may apply a lateral force to the inner member 806 to lock it in position. However, other locking means may be used.

In use, a workpiece 808 is held by the adhesive fastening element 802. Specifically, the inner member 806 is positioned such that it is level with the outer member 804 and locked in this position with the locking means. Alternatively, the inner member 806 may be raised slightly from the outer member 804. An adhesive 810 is applied to the bonding surface of the inner member 806. The adhesive 810 forms a bond between the workpiece 808 and the inner member 806. Accordingly, the adhesive fastening element 802 holds the workpiece 808 still whilst performing manufacturing processes, such as machining, or whilst inspecting the workpiece 808.

The adhesive 810 may be any known adhesive. Preferably, the adhesive is a photo-activated adhesive. Where such an adhesive is used, the inner member 806 may be formed from or comprise a transparent material. Accordingly, the inner member 806 may be used to transmit light from a light source to the surface of the inner member 806 where it cures the adhesive 810. For example, the inner member 806 may be an optical fibre made of Perspex.

Prior to the manufacturing process or inspection of the workpiece 808, the integrity of the adhesive bond may be checked by applying a predetermined force between the inner member 806 and the workpiece 808. The predetermined force is between the minimum required holding force required by the operation and the fully cured failure strength of the bond.

Figure 18:
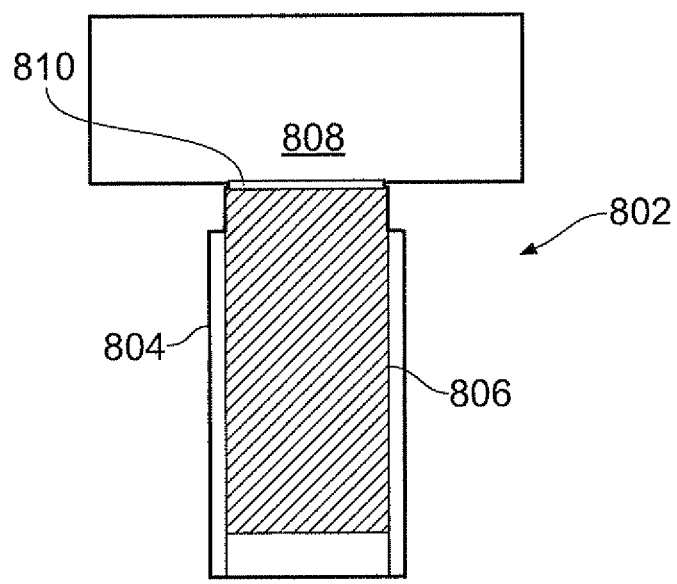
FIG. 18 is a cross-sectional view of the adhesive fastening element of FIG. 17 after a first stage of a method for removing the workpiece from the adhesive fastening element in accordance with another aspect of the invention.
Figure 19:
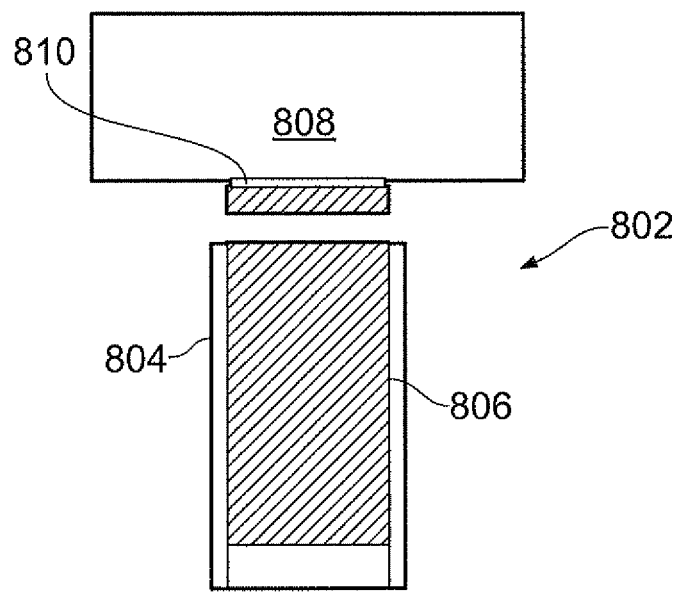
FIG. 19 is a cross-sectional view of the adhesive fastening element of FIG. 17 after a second stage of the method.

In order to detach the workpiece 808 from the adhesive fastening element 802, a method in accordance with another aspect of the invention is used, as illustrated by FIGS. 18 and 19.

As shown in FIG. 18, the inner member 806 is released and moved relative to the outer member 804 so that it is raised above the outer member 804. The inner member 806 is then cut at the level of the outer member 804, as shown in FIG. 19. Consequently, a portion of the inner member 806 comprising the bonding surface is removed from the remainder of the inner member 806 and stays connected to the workpiece 808.

Accordingly, the surface of the inner member 806 forms a new bonding surface for the subsequent attachment to another workpiece 808. Therefore, the adhesive fastening element 802 is immediately ready for further operations. The adhesive 810 and the portion of the inner member 806 may be subsequently removed from the workpiece 808 using conventional methods.

Alternatively, for ease, the inner member 806 may be cut above the level of the outer member 804. The inner member 806 can then be moved back within the outer member 804 until it is level with the outer member 804.

When the inner member 806 has been fully consumed, a replacement inner member 806 can be inserted into the outer member 804.

In another embodiment, the inner member 806 may be formed by a plurality of individual unconnected portions. The foremost portion of the inner member 806 is bonded to the workpiece 808. When the locking means are released, the foremost portion may be removed with the workpiece and the remaining portions advanced until the preceding portion becomes level with the outer member 804. The remaining portions may be advanced by inserting another portion into the bottom of the outer member 804.

Alternatively, the inner member 806 may be formed by a plurality of frangible portions which are interconnected by weakened sections (for example, thinner sections or perforations). The frangible members may be separated from one another by hand.

In another embodiment, the inner member 806 may be formed from a thermoplastic adhesive fibre, such as a hot melt adhesive. The inner member 806 may be melted at the bonding surface where it contacts the workpiece 808. When the inner member 806 solidifies it forms a bond with the workpiece 808. In order to remove the workpiece 808 from the adhesive fastening element 802, the inner member 806 may be cut or removed as described above.

Although it has been described that a portion of the inner member 806 is cut or removed, the entire inner member 806 may in fact be replaced after each operation to provide a new bonding surface.

Figure 20:
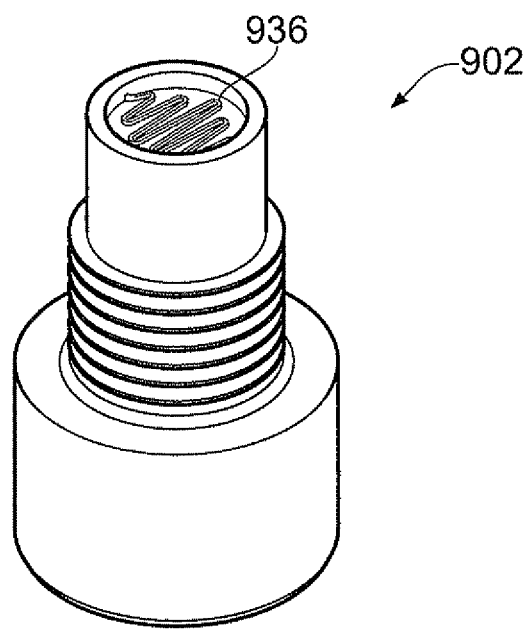
FIG. 20 is a perspective view of an embodiment of an adhesive fastening element having a heating element in accordance with another aspect of the invention.
Figure 21:
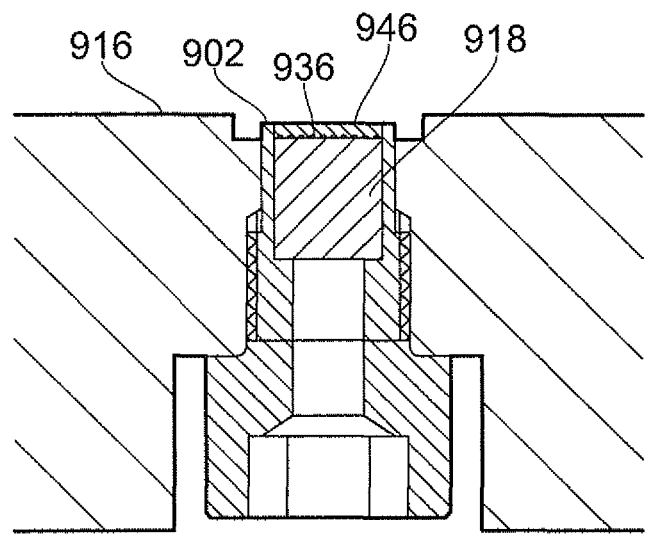
FIG. 21 is a cross-sectional view of the adhesive fastening element of FIG. 20.

With reference to FIGS. 20 and 21, an embodiment of an adhesive fastening element 902 in accordance with another aspect of the invention is shown. The adhesive fastening element 902 comprises a resistive heating element 936 embedded within the adhesive fastening element 902. The heating element 936 is a resistive wire. Alternatively the heating element 936 may comprise a resistive film heating element sandwiched between transparent materials.

The adhesive fastening element 902 comprises a core formed from an optical material 918. The heating element 936 is disposed on the optical material 918 and is covered by a layer 946 of thermally conductive and optically transparent material. For example, the layer 946 may be formed from a glass ceramic material or a diamond material deposited using a chemical vapour deposition (CVD) process. Such a material has a high thermal conductivity and thus concentrates heat at the site of the adhesive bond. Furthermore, such materials are hard wearing and thus the layer 946 protects the heating element 936 and allows any residual adhesive to be removed from the adhesive fastening element 902 without causing damage. The diamond may be produced using a CVD process to form a thin layer (typically 0.5 mm thick) and then glued onto the top of the adhesive fastening element 902. However, it may also be possible to directly CVD coat the diamond material onto the adhesive fastening element 902 to form the layer 946.

In use, the adhesive fastening element 902 is threadably coupled to a base plate 916 (see FIG. 21), however other types of coupling could be used. The layer 946 separates the heating element 936 from an adhesive (not shown) which is disposed on the layer 946 and which is used to bond the adhesive fastening element 902 to a workpiece (not shown). Where the adhesive is a photo-activated adhesive, light is supplied to the adhesive through the optical material 918 and the layer 946 in order to cure the adhesive and to form a bond between the adhesive fastening element 902 and the workpiece.

The workpiece may be de-bonded from the adhesive fastening element 902 by heating the cured adhesive in order to break down the bond between the adhesive fastening element 902 and the workpiece. Accordingly, a current is passed through the resistive wire or film of the heating element 936, thus heating the wire or film. The thermally conductive layer 946 conducts the heat from the heating element 936 to the adhesive on the surface of the layer 946, thus breaking down the bond and releasing the workpiece from the adhesive fastening element 902.

The heating element 936 may also be used to heat a thermally cured adhesive so as to form the bond between the adhesive fastening element 902 and the workpiece.

Where a non photo-activated adhesive is used, it is not necessary to provide the optical material 918, nor is it necessary for the layer 946 to be optically transparent. The layer 946 may also be removed and the heating element 936 located at the surface of the adhesive fastening element 902.

Figure 22:
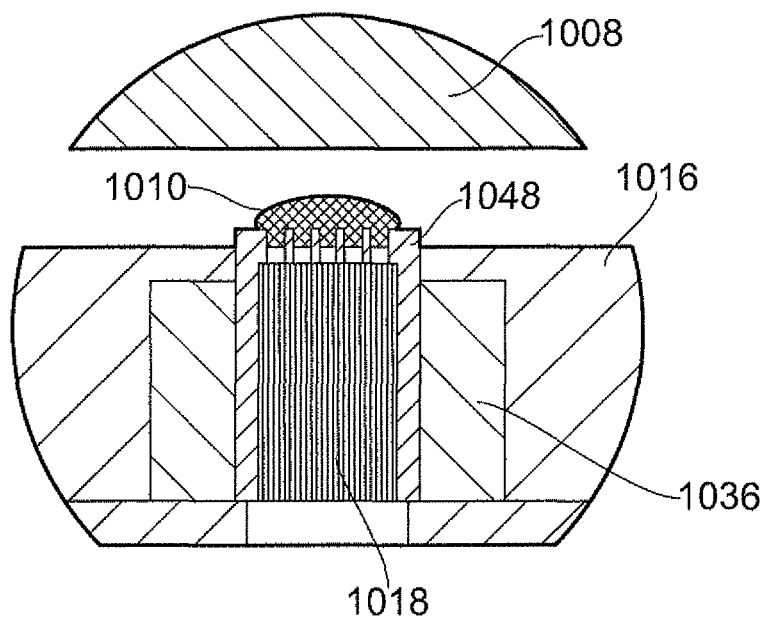
FIG. 22 is a cross-sectional view of another embodiment of an adhesive fastening element having a heating element.

FIG. 22 shows another embodiment of an adhesive fastening element 1002. The adhesive fastening element 1002 is disposed in a base plate 1016 and comprises a core formed from an optical material 1018. A heating element 1036 surrounds the adhesive fastening element 1002 and is in contact with an outer portion 1048 of the adhesive fastening element 1002.

In use, an adhesive 1010 is disposed between the fastening pin 1002 and a workpiece 1008. The adhesive 1010 is a photo-activated adhesive, and light is supplied to the adhesive 1010 through the optical material 1018 in order to cure the adhesive 1010 and to form a bond between the adhesive fastening element 1002 and the workpiece 1008.

The heating element 1036 is used to de-bond the workpiece 1008 from the adhesive fastening element 1002 by heating the adhesive 1010. Accordingly, the outer portion 1048 of the adhesive fastening element 1002 conducts heat from the heating element 1036 to the adhesive 1010 to break down the bond between the adhesive fastening element 1002 and the workpiece 1008. The outer portion 1048 of the adhesive fastening element 1002 is formed from a material having a high thermal conductivity, such as cooper or aluminium based alloys, and has a low thermal mass so as to ensure rapid heating and cooling.

The heating element 1036 may also be used to cure a thermally activated adhesive so as to form the bond between the adhesive fastening element 1002 and the workpiece 1008.

Figure 23:
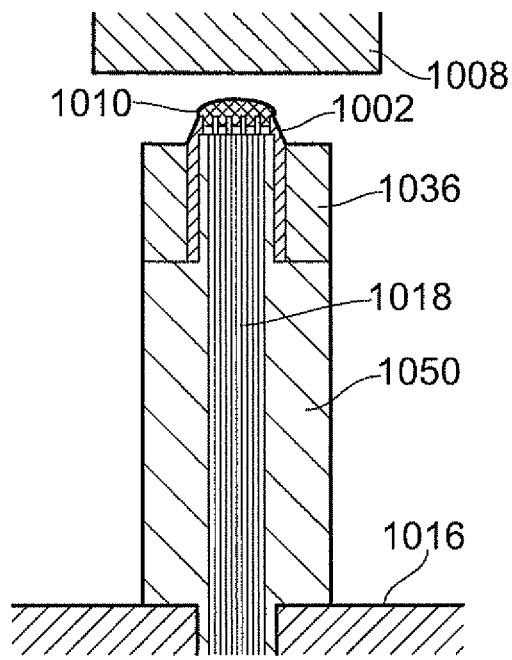
FIG. 23 is a cross-sectional view of another embodiment of an adhesive fastening element having a heating element.

As shown in FIG. 23, the adhesive fastening element 1002 may be adapted for inspection operations by raising the adhesive fastening element above the base plate 1016 using a support member 1050. Furthermore, the outer portion 1048 of the adhesive fastening element 1002 may taper towards its end so as to minimise the contact surface with the workpiece 1010, thereby maximising access to the workpiece and allowing the adhesive fastening element 1002 to be used with workpieces having irregular geometry.

Figure 24:
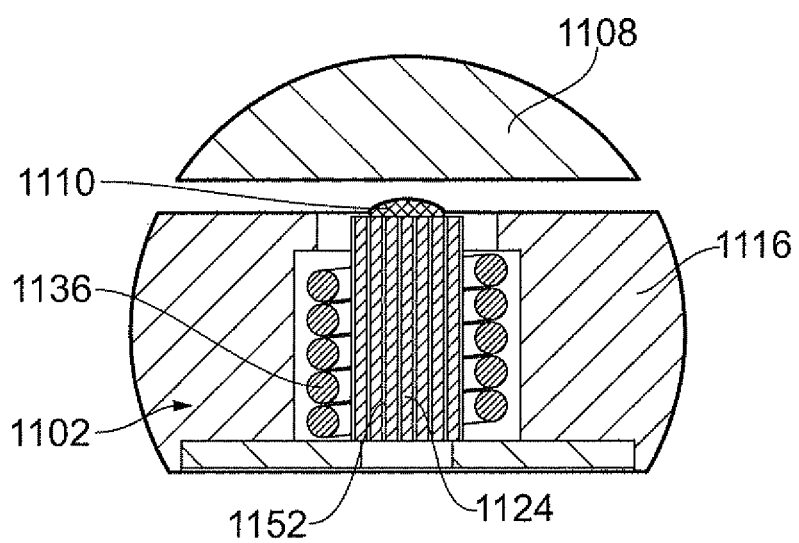
FIG. 24 is a cross-sectional view of another embodiment of an adhesive fastening element having a heating element.

FIG. 24 shows another embodiment of an adhesive fastening element 1102. The adhesive fastening element 1102 comprises a core formed by a plurality of optical fibres 1124, such as glass rods, which are encased in a metallic material 1152. The core is surrounded by an induction heating coil 1136.

In use, an adhesive 1110 is disposed between the fastening pin 1102 and a workpiece 1108. The adhesive 1110 is a photo-activated adhesive, and light is supplied to the adhesive 1110 through the optical fibres 1124 in order to cure the adhesive 1110 and to form a bond between the adhesive fastening element 1102 and the workpiece 1108.

The induction heating coil 1136 is used to de-bond the workpiece 1110 from the adhesive fastening element 1102 by heating the adhesive 1110.

Thermal induction heats electrically conducting objects by electromagnetic induction. A high-frequency alternating current is passed through the induction heating coil 1136 which generates eddy currents in the metallic material 1152 that surrounds the optical fibres 1124. The resistance of the metallic material 1152 to current flow and/or magnetic hysteresis losses causes the metallic material 1152 to be heated by the induction heating coil 1136. The metallic material 1152 conducts the heat to the adhesive 1110 to break down the bond between the adhesive fastening element 1102 and the workpiece 1108. The metallic material 1152 has a high thermal conductivity and a low thermal mass so as to ensure rapid heating and cooling.

As an alternative to the optical fibres 1124 encased in the metallic material 1152, a matrix of conductive and optical fibres may be used.

Furthermore, metallic particles or short strands of, for example, iron may be added to the adhesive 1110. This allows the induction heating coil 1136 to directly heat the adhesive 1110. In this configuration the materials of the adhesive fastening element 1102 should be electrically non-conductive in-order to maximise the concentration of inductive heat energy in the adhesive 1110. This technique may also aid with thermal curing of the adhesive 1110.

In another embodiment, the heating element may comprise one or more LEDs. The LEDs may be embedded at or close to the surface of the adhesive fastening element. The LEDs may be IR or UV LEDs, or a combination of IR and UV LEDs.

The LEDs produce sufficient heat at the surface of the adhesive fastening element to cure an adhesive and/or to de-bond a workpiece from the adhesive fastening element. Alternatively, the LEDs may cure the adhesive using UV light and only de-bond the workpiece from the adhesive fastening element using heat. An arrangement comprising a combination of UV and IR LEDs may be particularly useful for this purpose.

The heat may be managed using a CVD diamond based arrangement, such as a heat spreader.

The thermal effects in the adhesive fastening element can be controlled by: a thermal management system, the wavelength or intensity output rating of the LED, the power level applied to the LEDs, the LED type (UV/IR), and the adhesive type (for example, the lower strength Speedmask® UV adhesive may be curable and de-bondable using inexpensive, off the shelf, UV LEDs that can operate up to 120° C.).

The LEDs may be activated for approximately 20 seconds to cure the adhesive (with the temperature remaining below the de-bonding temperature) and approximately 40 seconds to obtain a sufficiently high temperature to de-bond the workpiece from the adhesive fastening element. At this temperature, the workpiece can be easily removed from the adhesive fastening element by hand and residual adhesive can be removed from the workpiece.

The adhesive fastening elements described herein may be attached to a pallet fixture (or tombstone), or directly to machine or inspection equipment. Furthermore, a workholding device may comprise one or more of the adhesive fastening elements described above.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For example, the integrity of the bond may be checked by applying a force between a workpiece and any of the adhesive fastening elements described. Furthermore, a light source and light meter may be used with any of the adhesive fastening elements to provide feedback on the presence of a workpiece and the curing of the adhesive. Moreover, any of the adhesive fastening elements may comprise an adhesive delivery tube and/or heating element as described.

Finally, a configuration as per the embodiment of FIGS. 12 to 14 may be used to form the other embodiments described herein. Specifically, the central pins may be retracted so that they sit lower than the other pins. The central pins therefore define a recess for receiving a protrusion of the workpiece, as in the embodiment of FIG. 14. Furthermore, the other pins can be adjusted to support the three dimensional surface of the workpiece.

The invention claimed is:

1. An adhesive fastening element for holding a workpiece, comprising a plurality of pins which are individually movable along a longitudinal axis of the adhesive fastening element to conform to the workpiece, one or more of the pins having an embedded adhesive delivery tube configured to supply adhesive to an exterior surface of the adhesive fastening element to bond the pins to the workpiece.

2. An adhesive fastening element as claimed in claim 1, wherein the tube is located in the centre of the adhesive fastening element.

3. An adhesive fastening element as claimed in claim 1, wherein the tube is configured to prevent adhesive from curing within the tube.

4. An adhesive fastening element as claimed in claim 3, wherein the tube is opaque.

5. An adhesive fastening element as claimed in claim 3, wherein the tube is non-metal.

6. An adhesive fastening element as claimed in claim 1, wherein the pins having adhesive delivery tubes are grouped together in the centre of the adhesive fastening element.

7. An adhesive fastening element as claimed in claim 1, wherein the pins having adhesive delivery tubes are distributed throughout a plurality of pins some of which do not have adhesive delivery tubes.

8. An adhesive fastening element as claimed in claim 1, wherein the pins have a hexagonal cross section.

9. An adhesive fastening element as claimed in claim 1, wherein each pin is separately indexable along a longitudinal axis of each pin.

10. An adhesive fastening element as claimed in claim 1, having a light source for providing light to an exterior surface of the adhesive fastening element so as to cure an adhesive; and
    a light meter for receiving light from the exterior surface of the adhesive fastening element; wherein the light source is controlled in response to the amount of light received by the light meter.

11. An adhesive fastening element as claimed in claim 10, further comprising a feedback loop between the light meter and the light source.

\* \* \* \* \*